Patented Dec. 19, 1950

2,534,640

UNITED STATES PATENT OFFICE 2,534,640

PROCEDURE FOR MAKING FODDER MEAL AND OIL FROM ANIMAL RAW MATERIALS

Otto Valen, Trondheim, Norway, assignor to A/S Lysøsund Sildolje- & Kraftforfabrik, Lysøsund pr., Trondheim, Norway No Drawing. Application February 28, 1949, Serial No. 78,892

2 Claims. (Cl. 99—2)

The present invention relates to a method for producing fodder meal and oil from for instance herring or similar kinds of fat fish and/or fodder meal made from lean fish.

The conventional method consists in directly steam-cooking the raw material and then pressing same. The press-cake is made into fodder meal by a drying process, and from the liquid thus pressed out the oil is recovered by a separator arrangement. The remaining liquid, the so-called glue water, is usually thrown away. This glue water, however, contains at least 20% of the non-fatty solids of the raw material in solution. Therefore, these valuable solids are lost. The glue water may be dehydrated in a suitable vacuum arrangement, but this method has not been found satisfactory either from an economical point of view, or as far as the product recovered is concerned.

Methods for the elimination or reduction of the quantity of glue water are previously known. One procedure consists in drying the raw material either in special vacuum apparatuses or other kinds of drying devices, in which half-dried material or press-cake is mixed into the raw mass to be treated in order to evade burning of the mass in the drier. These methods, however, have proved not to be practicable on for instance fat herrings, small herrings or other kinds of fat herrings as for instance Iceland herrings, and they have also other disadvantages, because the oil, and in some instances also the meal will get a dark colour.

Another procedure consists in dehydrating the glue water so as to get a suitable concentration, and then mix it into feedstuffs—or into fertilizer stuffs which are not completely dried, whereupon the concentrated glue water is dried together with the final drying treatment of the half-dried material. Neither this method has been used in the industry in spite of the fact that it offers the advantage of mixing into the fodder meal, by the dehydrating process, the dry-stuffs contained in the glue water.

The present invention relates to a procedure which may be used for all kinds of raw materials of the categories mentioned above, the object of said procedure being to retain the advantages of the cooking method, for instance brighter looking products, a low pressing capacity, and at the same time recovering the dry-stuff contained in the glue water.

The object of the procedure is, in the first place, to reduce to a minimum the quantity of the glue water, in order to make it possible to mix the glue water into the press-cake without previously dehydrating it, and then dry the glue water in the drying process to which the press-cake itself is subjected. By evading the pre-dehydrating of the glue water, the latter will be more easily sucked into the press-cake, whereby is obtained that the dry-stuff contained in the glue water will be more evenly mixed into the ready-made fodder meal.

By means of this procedure according to the invention the cooking of the raw material is effected by using indirect steaming. In this manner the unavoidable thinning of the glue water will be eliminated, a thinning which will always take place by the direct steaming process because the condensed water will always mix with the glue water. By the indirect steaming method, however, a certain quantity of liquid must be added to the raw material in order to prevent the burning of the mass in the cooker. According to the invention this is obtained by adding a small quantity of glue water, a quantity which is barely sufficient to prevent burning, and in cooking part of the glue water will evaporate together with part of the water contained in the raw material. The quantity of glue water may thus be kept as small as possible.

After being cooked the mass is subjected to pressure in the conventional manner, and after the separation process the glue water will be mixed into the press-cake and carried to the drier, as already mentioned.

However, even by the indirect cooking and by adding of glue water in the cooker, the quantity of glue water will ordinarily be so great that the drying goods will be unable to soak the glue water entirely. This drawback can be eliminated by subjecting the glue water, prior to its mixing with the press-cake, to a slight evaporation, but this procedure would mean that the increasing concentration would delay the soaking action, and, in addition thereto, would require equipment of greater dimensions. According to the invention these drawbacks have been eliminated, in the first place by the drying process passing through two stages and limiting the drying process to making the mass half-dry in the first stage, and, secondly, by carrying part of the drying-goods from the first stage back to the drier again, adding fresh glue water. As will be seen, it is the object of this process to soak into the drying goods the excess glue water which the press-cake is unable to soak. For this purpose the drying of the press-cake proceeds until it becomes half dried, thus enabling the drying goods to soak the glue water much quicker than goods which is entirely dry, the latter getting a crust which must be softened through before the liquid can get into the goods. From the pre-drying apparatus, as will be understood, part of the drying goods is carried back again while the remaining part proceeds to the final stage in the drying process.

It is important that glue water, which, according to the invention, is added to the drying-goods, is not thinned. Thinning of the press liquid and/or the glue water should be avoided on all the stages of the process. Therefore, the present invention also relates to all the stages prior to the drying having relation to the straining and separation processes.

The liquid (the press-liquid) which is pressed out of the goods being cooked, will first have to be strained in order to prevent the sludge particles contained in the liquid from rendering the separation process difficult, and the strainer will have to be flushed regularly. By passing through the strainer arrangement the flush liquid will mix with the liquid having been strained off. Up to now the flushing has been performed by using clear water, whereby a thinning of the liquid strained off will result.

According to the invention said flushing is performed with indirectly steam-heated glue water, so that no thinning thereof takes place. Pre-heating of the glue water is necessary to make it thin and easily flowing.

After the straining process the liquid is separated for the purpose of recovering the oil contained therein. Also for the separator is required flush liquid. According to the invention this flushing process is also performed using indirectly steam-heated glue water.

Another cause of the glue water being thinned may reside in the necessary pre-heating of the press-liquid prior to the separation process, because up to now, said pre-heating has been effected by direct steam-heating, where, as has been said already, the condense water is mixed with the press liquid.

According to the invention, this thinning of the press-liquid is eliminated by using the indirect steam-heating procedure.

Having thus described my invention, I claim:

1. In the processing of fish for the preparation of fodder meal and oil the steps which comprise cooking the fish by indirect steam heating whereby "glue water" subsequently obtained is not diluted, pressing the cooked fish to obtain a press cake of wet fodder meal and an aqueous liquid extract comprising "glue water" and fatty oils, separating the oil from the "glue water," half-drying the press cake, admixing the "glue water," without concentration thereof, with the press cake, and completing the drying of the press cake, whereby the dried cake thus contains the dissolved solids of the "glue water."

2. In processing fish for the recovery of a fodder meal in which "glue water" is obtained as a by-product, the method of recovering dissolved solids in the "glue water" which comprises admixing "glue water" as obtained in the process, without either dilution or concentration thereof, with half-dried fodder meal, and then continuing the drying of the fodder meal.

OTTO VALEN.

REFERENCES CITED

The following references are of record in the file of this patent:

UNITED STATES PATENTS

| Number | Name | Date |
|---|---|---|
| 1,204,845 | Brune | Nov. 14, 1916 |
| 1,273,072 | Kuzmier | July 16, 1918 |
| 1,399,471 | Faitelowitz | Dec. 6, 1921 |
| 2,455,782 | Kuder | Dec. 7, 1948 |